Patented July 29, 1952

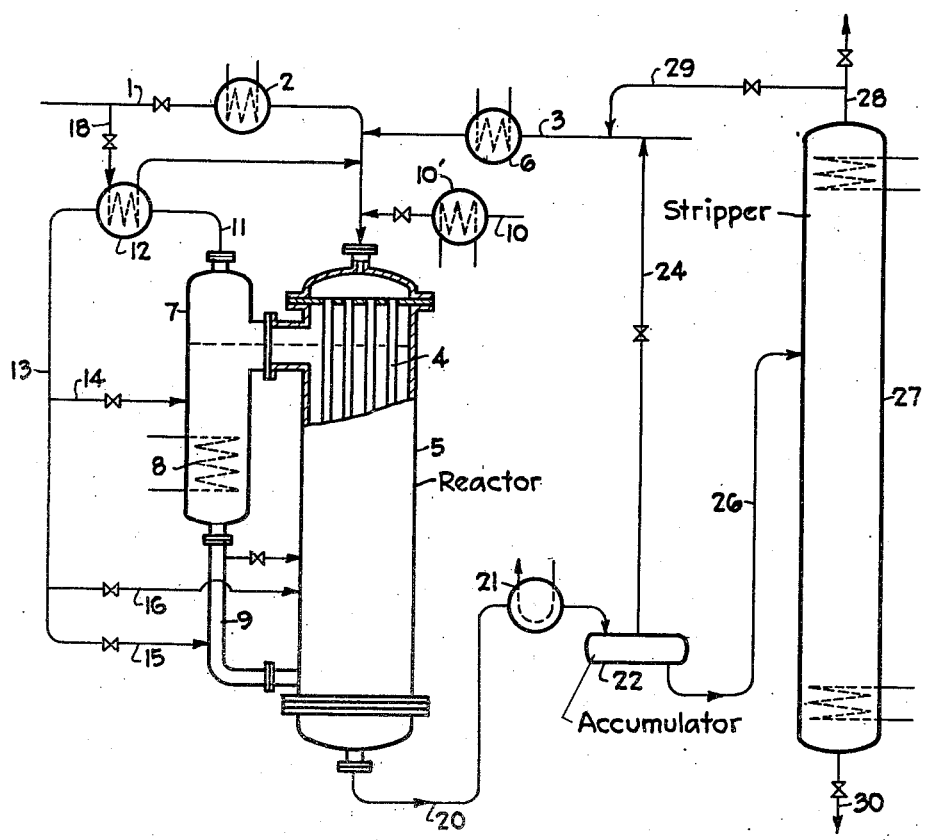

2,605,264

UNITED STATES PATENT OFFICE 2,605,264

PROCESS FOR THE PRODUCTION OF PYRIDINES

Han Hoog and Willem Frederik Engel, Amsterdam, Netherlands, assignors to Shell Development Company, San Francisco, Calif., a corporation of Delaware Application June 6, 1947, Serial No. 752,970
In the Netherlands February 25, 1944

2 Claims. (Cl. 260—290)

This invention relates to the production of unsaturated cyclic nitrogen compounds containing a six-membered monoheteroatomic ring in which the heteroatom is nitrogen. The invention relates more particularly to the production of alkyl pyridines. A particular aspect of the invention relates to the production of beta-picoline.

The unsaturated cyclic nitrogen compounds containing nitrogen in the ring, such as the alkyl pyridines, are valuable as starting or intermediate materials in the production of a wide variety of products comprising dyes, pharmaceuticals and many other chemical derivatives. Thus 3 methyl pyridine (beta-picoline) is the starting material for such valuable chemical derivatives as nicotinic acid. Methods disclosed heretofore for the production of these organic nitrogen compounds are often handicapped by difficulties rendering impractical their utilization on a large scale. Such difficulties comprise, for example, the presence to an inordinate degree of undesirable side reactions, involving not only relatively low yields of the desired products but also resulting in a loss of valuable charge material because of its unavoidable conversion to less valuable by-products. Such undesirable side reactions often comprise to at least a substantial degree, decomposition reactions resulting in a rapid fouling of the catalyst with consequent irregularity of operation of the process. Further disadvantages of such processes disclosed heretofore comprise their limitation to the use of charge materials generally resulting in the production of reaction mixtures from which a specifically desired cyclic compound can often be separated only with great difficulty.

It is an object of the present invention to obviate the above difficulties and to provide an improved process for the more efficient production of unsaturated cyclic nitrogen compounds having a six-membered monoheteroatomic ring in which the heteroatom is nitrogen.

It is a further object of the invention to provide an improved process for the more efficient production of unsaturated cyclic nitrogen compounds comprising alkyl pyridines.

A still further object of the invention is the provision of an improved process for the more efficient production of methyl pyridines (picolines) from readily available starting material.

Another object of the invention is the provision of an improved process for the more efficient production of beta-picoline. Other objects and advantages of the invention will become apparent from the following detailed description thereof.

The objects and advantages of the present invention are obtained by bringing an aliphatic alcohol and/or aldehyde in admixture with ammonia and/or an aliphatic amine into direct contact with a condensation catalyst, at a temperature of from about 300° C. to about 500° C., with a throughput rate of at least 0.1 and preferably at least 0.3 kg. of alcohol and/or aldehyde per liter of catalyst per hour, while in indirect heat exchange with a fluid heat controlling medium.

A particular advantage of the process resides in the ability to utilize efficiently unsaturated aliphatic alcohols as starting material. Suitable aliphatic unsaturated alcohols which are employed as starting material in the process of the invention comprise the beta, gamma-olefinic alcohols. By the term, "beta, gamma-olefinic alcohols" used in the present specification and attached claims, is meant the class of unsaturated alcohols having a olefinic, double bonded linkage between two carbon atoms which are in the beta and gamma position with respect to the saturated carbon atom to which the hydroxyl group of the alcohol is directly attached. In other words, the class of unsaturated alcohols utilized as charge to the process of the invention has an olefinic linkage between two carbon atoms, one of which is linked to a saturated carbon atom having the OH group linked directly thereto. The lowest member of such beta, gamma-unsaturated olefinic alcohols is allyl alcohol.

The alcohol and/or aldehyde charge to the system need not necessarily consist of only a single alcohol and/or aldehyde, but may comprise a mixture of a plurality of such alcohols and/or aldehydes. The charge may furthermore comprise lesser amounts of other hydrocarbons capable or not of undergoing conversion under the reaction conditions but incapable of undergoing reaction with the reactants or otherwise unfavorably influencing the process under the operating conditions employed.

Ammonia, gases comprising ammonia, or compounds giving rise to ammonia under the reaction conditions, obtained from any suitable source, is combined with the unsaturated aliphatic alcohol charge or is separately introduced into the reaction zone. Although the use of ammonia is preferred as the reactant providing the nitrogen atom, ammonia may be replaced in part or in its entirety with an aliphatic amine within the scope of the invention. Suitable aliphatic amines which may be employed comprise for example methylamine, ethylamine, n-propylamine, isopropylamine, dimethylamine, diethylamine, dipropylamine, n-butylamine, isobutylamine, the dibutylamines, the amylamines, the dihexylamines, methylpropylamine, methylbutylamine, ethylbutylamine, propylamylamine, cyclopentylamine, methylcyclopentylamine, cyclohexylamines, and the like. If desired, more than one such amine may be charged to the reaction zone. A preferred group of amines comprises the aliphatic primary amines, such as, for example, isopropylamine, n-propylamine, sec-amylamine, sec-butylamine, isoamylamine, the hexylamines, and the like.

The introduction of ammonia and/or amine into the system is preferably controlled to maintain at least one mol of ammonia or amine per mol of alcohol and/or aldehyde in the reaction zone. It is preferred to maintain a mol ratio of ammonia or amine to alcohol and/or aldehyde charge of from about 1 to about 15, and preferably from about 3 to about 10. It is to be understood, however, that the amount of ammonia or amine introduced into the system may vary to some degree from the above limits within the scope of the invention.

Diluents, comprising for example nitrogen or steam, may be mixed with the charge, or may be separately introduced into the reaction zone at one or more points along the length thereof. Diluents such as, for example, nitrogen, are suitably employed in a mol ratio of nitrogen to alcohol and/or aldehyde charge of from about 0.25 to about 10, and preferably from about 0.5 to about 1.5. Higher or lower ratios of the nitrogen diluent may, however, be employed within the scope of the invention.

Reaction of the alcohol and/or aldehyde with the ammonia and/or aliphatic amine in the presence of the catalyst is effected at a temperature in the range of, for example, from about 300° C. to about 500° C. and preferably from about 375° C. to about 425° C. Atmospheric or superatmospheric pressures may suitably be employed.

Suitable catalysts comprise broadly the condensation catalysts. Such condensation catalysts comprise, for example, the compounds of metals contained in the second subgroup to the sixth group of the periodic table, which have a more metallic character than arsenic. By the term "having a more metallic character than arsenic" is intended those metals which are precipitated from solutions of water-soluble salts of the respective metals by the addition of metallic arsenic to said solutions. Particularly suitable compounds of these metals comprise the oxides of the metals comprised in the second subgroup to the fifth group of the periodic table. Examples of such catalysts are, for example, those comprising an oxide of aluminum. Desirable combinations comprise the combination of a difficultly reducible metal oxide of the above metals, such as for example an oxide of aluminum, silicon, magnesium or the like, with a less readily reducible metal oxide.

The catalysts may be synthetically prepared or of naturally occurring origin. Thus the suitable oxides of aluminum comprise the alumina-containing catalysts synthetically prepared as well as such naturally occurring materials as the activated alumina of commerce, bauxite, and the like. The catalysts may be subjected to any pretreatment prior to use in the process, to favorably affect the catalytic activity thereof. Thus they may be subjected to elevated temperature, and treated at such temperatures with inert and/or activating gases, such as nitrogen, hydrogen, steam and the like, the particular pretreatment depending upon the particular characteristics of the catalyst. Such catalysts as the synthetic or naturally occurring clays, oxides of aluminum, bauxite, and the like, may be subjected to acid treatment prior to use to increase their activity in the process.

Although condensation catalysts broadly as a class may be employed in the process of the invention, it has been found that substantially improved results are obtained by the use as catalyst of materials capable of acting both as a dehydrating and a dehydrogenation catalyst. Suitable catalysts of this preferred class comprise those catalysts containing a single component possessing the ability to catalyze both dehydrating and dehydrogenation reactions. Particularly preferred catalysts, however, comprise the combination of a dehydrating catalyst with a dehydrogenation catalyst. Suitable dehydrating catalyst components of such catalyst combinations comprise for example the oxides of aluminum, silicon. Suitable dehydrogenation catalyst components to be combined therewith comprise, for example, copper, and its oxides. Examples of particularly desirable catalyst combinations comprise $Al_2O_3$-Cu; $Al_2O_3$-Cu-Ni. Of the foregoing catalysts those comprising alumina in combination with copper are particularly preferred.

In accordance with the process of the invention the reactants are passed through the reaction zone at a throughput rate of at least 0.1 kg. and preferably at least 0.3 kg. of alcohol and/or aldehyde per liter of catalyst per hour. Such higher throughput rates not only enable producing the cyclic nitrogen compounds at a rate bringing the process within the realm of practical scale of operation, but also obviate to a substantial degree the difficulties and disadvantages resulting from decomposition to a substantial degree of the alcohol and/or aldehyde charge. At throughput rates of less than about 0.1 kg. of aldehyde or alcohol per liter of catalyst per hour, the carbon decomposition occasioned by the decomposition reaction, and the ensuing difficulties, taken together with the slow rate of cyclic nitrogen compound production, generally render operation of the process highly impractical. The following example is illustrative of the substantial increase in rate of alcohol and/or aldehyde decomposition, as evidenced by rate of carbon deposition upon the catalyst, when operating at throughput rates substantially below about 0.1 kg. of alcohol and/or aldehyde per liter of catalyst per hour.

Example I

In a plurality of comparative separate operations mixtures of acrolein, ammonia and nitrogen containing 5 mols of ammonia and 2.5 mols of nitrogen per mol of acrolein were contacted with a catalyst consisting essentially of alumina. The reaction zone consisted of an electrically heated tube. The temperature employed in each run, the degree of acrolein decomposition as measured by the amount of carbon on catalyst in terms of mol per cent of acrolein charged, and the throughput rate employed in terms of kilograms of acrolein per liter of catalyst per hour, are indicated for each run in the following table:

| Run No. | Temperature °C. | Throughput Rate | Carbon Deposition |
|---|---|---|---|
| 1 | 350 | 0.04 | 14.9 |
| 2 | 375 | 0.04 | 14.2 |
| 3 | 400 | 0.04 | 15.2 |
| 4 | 400 | 0.08 | 8.1 |

It is seen from the foregoing example that with a throughput rate of only 0.04 kg. of acrolein per liter of catalyst per hour the carbon deposition is approximately double that obtained when operating at a throughput rate approaching 0.1 kg. per hour. The exceedingly low carbon deposition obtained in a comparative operation using a throughput of more than 0.3 kg. of alcohol and/or aldehyde per liter of catalyst per hour is evidenced by the following example utilizing allyl alcohol as the charge material.

Example II

A mixture of allyl alcohol, ammonia and nitrogen, containing 5 mols of ammonia and 0.75 mol of nitrogen per mol of allyl alcohol was passed through an electrically heated tubular reactor containing a catalyst consisting essentially of alumina and copper at a temperature of 400° C. The carbon deposition upon the catalyst amounted to only about 2.5 mol per cent of the allyl alcohol charged.

Throughput rates up to about 1.5 kg. and preferably up to about 1.25 kg. of alcohol and/or aldehyde per liter of catalyst per hour are suitable. Higher throughput rates are, however, comprised within the scope of the invention.

The throughput rates employed, essential to production of the cyclic compounds at a rate commensurate with practical scale operation, however, involve additional difficulties adversely affecting operation of the process. The higher throughput rates aggravate difficulties with respect to temperature control within the reactor. Localized overheating of the catalyst is generally encountered in reaction zones as heretofore employed in such processes. Such localized overheating is highly undesirable because it renders impossible any degree of relatively accurate control of the reaction and consequently of the nature of composition of the reaction mixtures obtained. Although the total carbon deposition upon the catalyst at the higher throughput rates is relatively low, its formation will in general be concentrated at the points within the catalyst bed at which localized overheating is encountered. Such concentration of carbon deposition will seriously offset any advantage in the use of the more rapid throughput rates. It has now been found that localized overheating of the catalyst and concomitant difficulties are obviated to at least a substantial degree by maintaining the reactants in indirect heat exchange with a fluid heat controlling medium while directly contacting them with the catalyst at a rate of throughput above the above-defined medium.

In order to set forth more fully the nature of the invention, it will be described in detail with reference to the production of unsaturated cyclic nitrogen compounds comprising beta-picoline from charge materials comprising an unsaturated aliphatic alcohol and ammonia. Reference will be had to the attached drawing wherein the single figure illustrates more or less diagrammatically one form of apparatus suitable for carrying out the process of the invention.

An unsaturated aliphatic alcohol such as, for example, allyl alcohol, passes from an outside source through valved line 1, provided with a suitable heating means such as a heat exchanger 2, into a reaction zone. Ammonia, gas comprising ammonia, or a compound giving rise to ammonia under the reaction conditions, is passed from an outside source through valved line 3, provided with heating means 6, into feed line 1. Diluent material such as nitrogen, if employed, is introduced into the system by means of line 10 provided with a heating means.

Any suitable type of reaction zone enabling efficient contact of reactants and catalyst while in indirect heat exchange relationship with a fluid heat controlling medium, may be employed. A particularly desirable type of reaction zone comprises an elongated reaction zone of restricted cross-sectional area, such as, for example, a coil, or tube bundle, immersed in the fluid heat controlling medium. In the drawing the reaction zone is depicted as comprising a tube bundle 4, positioned in an enlarged chamber 5. The charge heated by means of heat exchangers 2, 6 and 10, is introduced into catalyst tubes 4. A catalyst of the class above-defined such as, for example, a catalyst consisting essentially of alumina and copper, is contained in tubes 4. Tubes 4 are surrounded by a suitable fluid heat controlling medium which substantially fills chamber 5. Any suitable fluid heat controlling medium such as, for example, a normally liquid material, or a normally solid material which is liquid at the reaction temperature, may be employed. Examples of suitable heat controlling fluids comprise, for example, mercury, molten salts, such as for example $SbCl_3$, mixtures of molten salts which may or may not undergo interaction under temperature conditions employed; suitable salt mixtures comprise, for example, $NaCl-KCl-ZnCl_2$, etc.; other suitable heat controlling fluids comprise, for example, molten diphenyl, a melt of diphenyl and diphenyl oxide and the like.

The heat controlling fluid surrounding tubes 4 in chamber 5 may be entirely in the liquid or vapor state, or may be partially in the liquid and partially in the vapor state. In the latter case advantage is taken of the latent heat of vaporization of the heat controlling fluid to aid in maintaining the uniform temperature condition throughout the length of tubes 4. Boiling temperature of the heat controlling fluid may be controlled by increasing or decreasing the pressure upon the heat controlling fluid. In the type of reactor shown in the drawing there is provided a chamber 7 containing a closed coil 8. Chamber 7, in open communication with chamber 5, provides a means for storing additional heat controlling fluid and for maintaining the proper temperature thereof by means of additional introduction or withdrawal of heat from its contents by passing an additional heat controlling fluid, heated or cooled at an outside source, through closed coil 8. Additional means for heating the contents of chamber 7, including direct heating means, not shown in the drawing, may be provided. Heat controlling fluid flows from the lower part of chamber 7 to the chamber 5, by means of line 9.

When resort is had to the vaporization of heat controlling fluid within chamber 5, vapors of heat controlling fluid may be passed from chamber 7 through line 11 into a heat exchanger 12 wherein they are condensed and passed therefrom through valved line 13 into chamber 7 by means of valved line 14, or into line 9 and/or chamber 5 by means of valved lines 15 and 16, respectively. A part or all of the charge to the system may be employed to effect the condensation of the vaporized heat controlling fluid. A by-pass line 18 is accordingly provided for the passage of allyl alcohol charge from line 1 through the indirect heat exchanger 12.

In the described manner the reaction tubes 4 are maintained at a temperature within the above-defined reaction temperature range uniformly throughout their entire length, resulting in the interaction of the ammonia and allyl alcohol with the formation of reaction products comprising beta-picoline.

Reactor effluence comprising unconverted charge material, and alkyl pyridines outside of the boiling range of beta-picoline, are passed from reaction tubes 4 through line 20 and cooling means 21 into an accumulator 22. Gaseous materials, comprising nitrogen diluent, if employed, and ammonia, may be bled from accumulator 22 and passed through valved lines 24 and 3 into feed line 1.

Products are taken from accumulator 22 and passed through line 26 into a still or stripper, represented in the drawing by column 27. Within column 27 a normally gaseous fraction comprising ammonia is separated from the reaction products and passed overhead through valved lines 28, 29 and 3 into feed line 1. Liquid, comprising beta-picoline-containing reaction products, is taken from the lower part of column 27 by means of valved line 30 and passed to a product separating means.

Suitable product separating means which may be employed comprise such steps as distillation, fractionation, solvent extration, extractive distillation, adsorption and the like. Unreacted material and diluent gases separated from the reaction products are recycled to the reaction zone.

The products obtained will vary to some extent with the nature of the charge material employed. Thus, whereas the use of the lower boiling unsaturated hydrocarbons, such as allyl alcohol, will result in the obtaining of products comprising substantial amounts of picolines, the use of relatively higher boiling unsaturated alcohols as the charge material will result in the obtaining of increasing amounts of alkyl substituted pyridines having substituent alkyl groups of more than one carbon atom, or having a plurality of substituent alkyl groups.

The process of the invention lends itself with particular advantage to the production of beta-picoline from allyl alcohol. When employing a catalytic material having both dehydrating and dehydrogenation properties, products are readily obtained comprising substantial amounts of beta-picoline and free from any substantial amounts of pyridine or alpha picoline.

Although the process of the invention enables the attainment of substantially improved efficiency, the reaction products will of course still comprise, besides the specifically desired six-membered monoheteroatomic ring compounds, a certain amount of other materials such as unreacted charge, six-membered monoheteroatomic ring compounds higher boiling than the specific one desired, some nitriles, and the like. The composition of the reaction mixture obtained will generally vary, not only in accordance with the specific materials charged, but also with the reaction conditions employed. An advantage of the invention resides, however, in the fact that the reaction mixture generally obtained enables the separation therefrom of the specifically desired six-membered heterocyclic ring compound with substantially greater facility than is possible in many of the processes for the production of similar products disclosed heretofore.

Though the invention is nowise limited to any method by which the products are separated, a suitable method for effecting such separation is the following: The products are separated into a nitrile-containing fraction and a fraction comprising the six-membered monoheteroatomic ring compounds. This is effected by fractionation. Another method of effecting such separation comprises the treatment of the reaction products with hydrochloric acid to effect the solution of the amines and heterocyclic six-membered ring compounds leaving the greater part of the nitriles undissolved. The undissolved nitriles are separated from the solution and the heterocyclic six-membered ring compounds are concentrated by rendering the solution alkaline and salting them out of solution. The six-membered ring compounds thus obtained are thereafter readily further separated from one another by fractionation.

In another method of effecting the separation of the desired product, the reaction mixture obtained is first fractionated to separate therefrom a fraction comprising the specific six-membered monoheteroatomic cyclic compound desired. Thereafter the six-membered cyclic compound specifically desired is separated therefrom by selective solution in hydrochloric acid.

The following example is illustrative of the method of producing six-membered monoheteroatomic ring compounds in accordance with the invention.

Example III

Allyl alcohol, in admixture with 5 mols of ammonia and 0.75 mol of nitrogen per mol of allyl alcohol, was contacted with a catalyst consisting essentially of alumina and copper and containing an atomic ratio of aluminum to copper of 40:10, at a temperature of 400° C. and atmospheric pressure. The reactor employed was a tubular reactor heated by means of an electrically heated coil wound about its exterior surface. The throughput rate was maintained at 0.34 kg. of allyl alcohol per liter of catalyst per hour. For a period of 13 hours of continuous operation 12 mol per cent of allyl alcohol was converted to picoline.

In a repetition of the operation under substantially identical conditions, but with the exception that the reactants were maintained in indirect heat exchange with a heat controlling fluid by immersing the tubular reactor in a heated melt consisting of 7 parts by weight of sodium nitrate, 40 parts of sodium nitrite and 53 parts of potassium nitrate, 20 mol per cent of the allyl alcohol charged was converted to picoline.

The invention claimed is:

1. The process for the production of beta-picoline which comprises bringing allyl alcohol in admixture with ammonia into direct contact with a catalyst comprising alumina and copper at a temperature of about 300° C. to about 500° C. and at a rate of at least 0.3 kg. of allyl alcohol per liter of catalyst per hour while in indirect heat exchange with a liquid heat controlling medium.

2. The process for the production of beta-picoline which comprises bringing allyl alcohol in admixture with ammonia into direct contact with a catalyst comprising alumina and copper at a temperature of from about 300° C. to about 500° C. and at a rate of at least 0.1 kg. of allyl alcohol per liter of catalyst per hour while in indirect heat exchange with a liquid heat controlling medium.

HAN HOOG.
WILLEM FREDERIK ENGEL.

(References on following page)

REFERENCES CITED

The following references are of record in the file of this patent:

UNITED STATES PATENTS

| Number | Name | Date |
|---|---|---|
| 1,900,382 | Jager | Mar. 7, 1933 |
| 2,011,317 | Groll | Aug. 13, 1935 |
| 2,413,598 | Ballard | Dec. 31, 1946 |

FOREIGN PATENTS

| Number | Country | Date |
|---|---|---|
| 463,530 | Germany | 1928 |
| 332,623 | Great Britain | July, 1930 |
| 334,193 | Great Britain | 1930 |
| 565,798 | Germany | 1932 |
| 569,630 | Germany | 1932 |
| 516,586 | Great Britain | 1940 |
| 534,494 | Great Britain | 1941 |

OTHER REFERENCES

Ser. No. 387,106 (A. P. C.), published July 13, 1943.